United States Patent
Tzeng et al.

(10) Patent No.: US 8,150,261 B2
(45) Date of Patent: Apr. 3, 2012

(54) UNIVERSAL REMOTE CONTROL DEVICE

(75) Inventors: Shing-Wu P. Tzeng, Fountain Valley, CA (US); David Paul Hochenedel, Aliso Viejo, CA (US)

(73) Assignee: OWLink Technology, Inc., Tustin, CA (US)

( * ) Notice: Subject to any disclaimer, the term of this patent is extended or adjusted under 35 U.S.C. 154(b) by 1324 days.

(21) Appl. No.: 11/752,215

(22) Filed: May 22, 2007

(65) Prior Publication Data

US 2008/0291074 A1  Nov. 27, 2008

(51) Int. Cl.
*H04J 14/00* (2006.01)
(52) U.S. Cl. ............. 398/67; 385/88; 439/557; 709/224
(58) Field of Classification Search .................. 398/67; 709/224; 439/557; 385/88
See application file for complete search history.

(56) References Cited

U.S. PATENT DOCUMENTS

| | | |
|---|---|---|
| 4,493,113 A | 1/1985 | Forrest et al. |
| 4,546,476 A | 10/1985 | Shaw et al. |
| 4,899,358 A | 2/1990 | Blakley |
| 5,325,423 A | 6/1994 | Lewis |
| 5,390,269 A | 2/1995 | Palecek et al. |
| 5,481,542 A | 1/1996 | Logston et al. |
| 5,481,634 A | 1/1996 | Anderson et al. |
| 5,621,715 A | 4/1997 | Ohyama |
| 5,890,162 A | 3/1999 | Huckins |
| 6,019,520 A | 2/2000 | Lin et al. |
| 6,130,625 A | 10/2000 | Harvey |
| 6,148,016 A | 11/2000 | Hegblom et al. |
| 6,151,432 A | 11/2000 | Nakajima et al. |
| 6,243,508 B1 | 6/2001 | Jewell et al. |
| 6,267,606 B1 * | 7/2001 | Poplawski et al. ............. 439/92 |
| 6,347,889 B1 | 2/2002 | Cheng |
| 6,353,169 B1 | 3/2002 | Juszkiewicz et al. |
| 6,381,045 B1 | 4/2002 | DiGiovanni et al. |
| 6,501,389 B1 | 12/2002 | Aguirre |
| 6,501,876 B1 | 12/2002 | Okada et al. |

(Continued)

FOREIGN PATENT DOCUMENTS

JP  2003-029096 A  1/2003

(Continued)

OTHER PUBLICATIONS

PCT International Search Report and Written Opinion, PCT/US08/63998, Jul. 17, 2008, 9 pages.

*Primary Examiner* — Timothy Edwards, Jr.
(74) *Attorney, Agent, or Firm* — Fenwick & West LLP (57) ABSTRACT

A universal remote control device controls both first and second electronic devices that may be remote from each other, via different communication channels. The remote control device is used with an optical fiber network, including a first optical transceiver coupled to the first electronic device, a second optical transceiver coupled to the second electronic device, and an optical fiber coupled between the first optical transceiver and the second optical transceiver. The remote control device comprises an infrared (IR) transmitter for transmitting a first control signal for controlling the first electronic device via an IR communication channel, and a wireless communication interface for transmitting a second control signal for controlling the second electronic device to the first optical transceiver via a wireless communication channel. The second control signal is further transmitted from the first optical transceiver to the second electronic device via the optical fiber and the second optical transceiver.

19 Claims, 7 Drawing Sheets

U.S. PATENT DOCUMENTS

| Patent/Publication | Date | Inventor(s) | Class |
|---|---|---|---|
| 6,524,015 B1 | 2/2003 | Cheng | |
| 6,524,481 B2 | 2/2003 | Zha et al. | |
| 6,637,948 B2 | 10/2003 | Shirai et al. | |
| 6,686,530 B2 | 2/2004 | Juszkiewicz et al. | |
| 6,694,074 B2 | 2/2004 | Schunk | |
| 6,821,146 B2 * | 11/2004 | Tolmie | 439/577 |
| 6,857,034 B1 | 2/2005 | DiSanza et al. | |
| 6,979,135 B2 * | 12/2005 | Ohe et al. | 385/88 |
| 7,034,891 B2 | 4/2006 | Joung et al. | |
| 7,121,741 B2 | 10/2006 | Furuta | |
| 7,136,550 B2 | 11/2006 | Mozdy | |
| 7,146,073 B2 | 12/2006 | Wan | |
| 7,158,700 B2 | 1/2007 | Duncan et al. | |
| 7,309,169 B2 | 12/2007 | Toillon et al. | |
| 7,385,175 B2 | 6/2008 | Li et al. | |
| 7,386,641 B2 * | 6/2008 | Xu et al. | 710/19 |
| 7,400,801 B1 | 7/2008 | Tong et al. | |
| 2001/0000826 A1 | 5/2001 | Bellamy | |
| 2001/0012428 A1 | 8/2001 | Nakajima et al. | |
| 2003/0039002 A1 | 2/2003 | Toriumi et al. | |
| 2003/0123659 A1 | 7/2003 | Forstrom et al. | |
| 2003/0133674 A1 | 7/2003 | Fujita et al. | |
| 2003/0147010 A1 | 8/2003 | Joung et al. | |
| 2003/0147650 A1 | 8/2003 | Hwang et al. | |
| 2003/0208779 A1 | 11/2003 | Green et al. | |
| 2004/0070491 A1 * | 4/2004 | Huang et al. | 340/10.5 |
| 2004/0131357 A1 * | 7/2004 | Farmer et al. | 398/67 |
| 2004/0160611 A1 | 8/2004 | Li | |
| 2005/0027539 A1 * | 2/2005 | Weber et al. | 704/275 |
| 2005/0053379 A1 | 3/2005 | Jockerst et al. | |
| 2005/0055483 A1 | 3/2005 | Devlin et al. | |
| 2005/0069130 A1 | 3/2005 | Kobayashi | |
| 2005/0254822 A1 | 11/2005 | Duncan et al. | |
| 2006/0004937 A1 | 1/2006 | Ip et al. | |
| 2006/0067690 A1 | 3/2006 | Tatum et al. | |
| 2006/0095943 A1 | 5/2006 | Demircin et al. | |
| 2006/0153503 A1 | 7/2006 | Suzuki et al. | |
| 2006/0153504 A1 | 7/2006 | Suzuki et al. | |
| 2006/0210278 A1 | 9/2006 | Cregg et al. | |
| 2007/0003288 A1 | 1/2007 | Tong et al. | |
| 2007/0019958 A1 | 1/2007 | Calhoon | |
| 2007/0037522 A1 * | 2/2007 | Liu et al. | 455/68 |
| 2007/0143801 A1 | 6/2007 | Madonna et al. | |
| 2007/0286600 A1 | 12/2007 | Guo et al. | |

FOREIGN PATENT DOCUMENTS

| | | |
|---|---|---|
| JP | 2003-167166 A | 6/2003 |
| JP | 2003-264513 A | 9/2003 |
| KR | 1020040007858 A | 1/2004 |

* cited by examiner

UNIVERSAL REMOTE CONTROL DEVICE

CROSS-REFERENCE TO RELATED APPLICATIONS

This application is related to (i) U.S. patent application Ser. No. 11/611,116, entitled "Indoor Digital Multimedia Networking," filed on Dec. 14, 2006, (ii) U.S. patent application Ser. No. 11/423,381, entitled "Integrated Remote Control Signaling," filed on Jun. 9, 2006, (iii) U.S. patent application Ser. No. 11/406,558, entitled "Protocol for Uncompressed Multimedia Data Transmission," filed on Apr. 18, 2006, and (iv) U.S. patent application Ser. No. 11/173,409, entitled "Bidirectional HDCP Transmission Module Using Single Optical Fiber," filed on Jun. 30, 2005, all of which are incorporated by reference herein in their entirety.

BACKGROUND OF THE INVENTION

1. Field of the Invention

The present invention relates to a universal remote control device that combines IR communication capabilities and wireless communication capabilities to control multiple electronic devices that may be located at remote locations.

2. Description of the Related Art

With the development of many different types of electronic devices and reduction in their cost, consumers typically have a number of different types of electronic devices at home. For example, consumers may use a high-definition TV (HDTV), a digital video disk (DVD) player, a cable set top box, a telephone, and a personal computer. Most of these electronic devices operate together with their own remote control devices that allow the user to control the operation of the electronic devices remotely. Since each electronic device has its own remote control device, there will likely be as many remote control devices as the number of electronic devices that the user has. As a result, it becomes very cumbersome for the user to switch between a number of different remote control devices to control different electronic devices.

Conventional universal remote control devices are available for use with different types of electronic devices. These conventional universal remote control devices are programmed to generate IR (infrared) remote control signals that are identical to the remote control signals generated by the separate remote control devices of multiple electronic devices. That way, a single universal remote control device can be conveniently used to control multiple electronic devices that accept IR-based remote control signals. Electronic devices that operate with IR-based remote control signals may include home multimedia devices or consumer electronic devices such as televisions, DVD players, set-top boxes, etc.

However, conventional universal remote control devices are only operable to generate IR-based remote control signals to control home multimedia devices or consumer electronic devices such as TVs, DVD players, set-top boxes etc., and are not capable of controlling other electronic devices such as personal computers (PCs), telephones, etc. This is because devices such as PCs, telephones, and the like typically do not operate with IR-based remote control signals and could be placed at a location remote and out of range from where the IR-based universal remote device is used.

For example, a user may want to use his PC to search for a product on the Internet while watching a TV program introducing the product. The user may be using a conventional universal remote control device to control the TV and other multimedia equipment, but it is still not possible for the user to control the PC with the conventional universal remote control device. Thus, the user would have to physically move to where the PC in order to use the PC and search for the product on the Internet, because the conventional universal remote control device cannot be used to control computers that may be remotely located. For another example, a user may want to make a telephone call while he is watching TV. The user has no choice but to physically move to where the telephone is, because the conventional remote control device does not have telephone functionalities.

Therefore, there is a need for a universal remote control device that can control different types of multiple electronic devices that may be placed in different locations.

SUMMARY OF THE INVENTION

Embodiments of the present invention include a universal remote control device that can control at least a first electronic device (e.g., a television) and a second electronic device (e.g., a computer) that may be remote from each other, via different communication channels. The universal remote control device operates with an optical fiber network, including a first optical transceiver coupled to the first electronic device, a second optical transceiver coupled to the second electronic device, and an optical fiber coupled between the first optical transceiver and the second optical transceiver. The remote control device comprises at least an infrared (IR) transmitter for transmitting a first control signal for controlling the first electronic device via an IR communication channel, and a wireless communication interface for transmitting a second control signal for controlling the second electronic device via a wireless communication channel to the first optical transceiver. The second control signal is further transmitted from the first optical transceiver to the second electronic device over a backward channel of the optical fiber and via the second optical transceiver.

The remote control device may further comprise a USB (universal serial bus) interface converting the second control signal in USB format for transmission to the first optical transceiver via the wireless communication channel. The USB interface is coupled to receive the second control signal from one of a plurality of components connected to USB interface.

The remote control device may further comprise a VoIP (Voice over IP) telephone controller, so that the remote control device may be used as a VoIP telephone. In this regard, the remote control device may further include a microphone for converting a first acoustic signal to a first electrical signal, a speaker for converting a second electrical signal to a second acoustic signal, and a CODEC (a coder/decoder) coupled to the microphone, the speaker, and the VoIP telephone controller. The CODEC codes the first electrical signal to a first, compressed electrical signal for processing by the VoIP telephone controller, and decodes a second, compressed electrical signal into the second electrical signal.

The universal remote control device according to the present invention has the advantage that it can be used to control a plurality of electronic devices that may be remotely located from each other, by utilizing the optical fiber network connecting these electronic devices. The IR communication channel of the remote control device may be used to transmit IR control signals for controlling, for example, a consumer electronic device such as a TV that is located close to the remote control device within the IR communication range. The wireless communication channel may be used to transmit control signals for controlling other electronic devices such as a computer that is located remotely from the remote control device, because such control signals may be transmitted remotely to those other electronic devices via the optical fiber. By including VoIP functionalities and input means (e.g., touchpad) in the remote control device, the remote control device becomes a "universal" remote control device that combines the functionalities of an IR remote control device, a computer input device such as a mouse or a keyboard, and a telephone, all in one device. As a result, a user may perform most control operations of multiple electronic devices using the single remote control device of the present invention.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
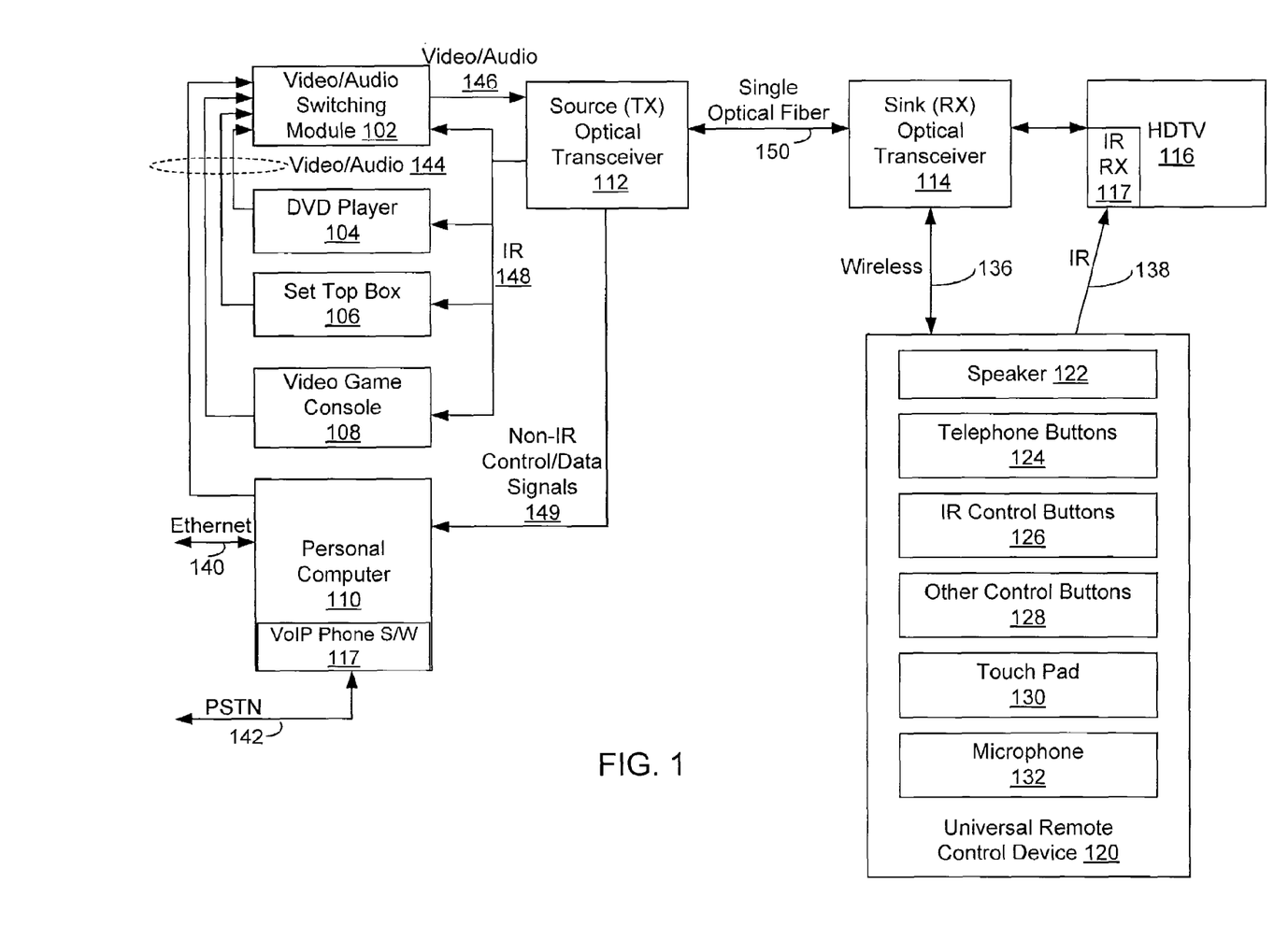
FIG. 1 illustrates a remote control system in which the universal remote control device according to one embodiment of the present invention is used to control multiple electronic devices.

FIG. 1 illustrates a remote control system in which the universal remote control device according to one embodiment of the present invention is used to control multiple electronic devices. The system shown in FIG. 1 includes multiple consumer electronic devices such as the DVD player 104, the (cable or satellite) set top box 106, the video game console 108, and the HDTV 116, a personal computer (PC) 110, a video/audio switching module 102, a single optical fiber 150 together with the source (TX) optical transceiver 112 and the sink (RX) optical transceiver 114, and a universal remote control device 120 according to one embodiment of the present invention. In the example of FIG. 1, the universal remote control device 120 is illustrated as one that is primarily designed for use with the remote control functions of the HDTV 116, although the universal remote control device 120 may be one for controlling any other consumer electronic device or computers. Although HDTV 116 is used in the example of FIG. 1, any type of television (e.g., a flat-panel liquid crystal display (LCD) television, a flat-panel plasma television, a high-definition television (HDTV)), a projector, or a computer monitor) can be used as the display device 116 operating together with the remote control functionalities of the universal remote control device 120. The use of a single optical fiber 150 and a video/audio switching module 102 to create a digital multimedia networking system is explained in detail in U.S. patent application Ser. No. 11/611,116, entitled "Indoor Digital Multimedia Networking," filed on Dec. 14, 2006, which is incorporated by reference herein its entirety. The personal computer 110 may be any type of general purpose computer, and is connected to various communication interfaces such as the Ethernet 140 and PSTN (Public Switched Telephone Network) 142.

As explained similarly in U.S. patent application Ser. No. 11/611,116, the DVD player 104, the set top box 106, and the video game console 108 are digital multimedia source devices providing video and/or audio signals for display on the HDTV 116. The video/audio switching module 102 selects video or audio signals 144 from one or more of the DVD player 104, the set top box 106, and the video game console 108 for transmission via the signal optical fiber 150. The source (TX) optical transceiver 112 converts the selected video/audio signal 146 to an optical signal suitable for transmission via the single optical fiber 150. The source (TX) optical transceiver 112 transmits the video-audio signals 146 in optical signal format via the forward channel of the signal optical fiber 150 to the sink (RX) optical transceiver 114. The sink (RX) optical transceiver 114 converts the received optical signal back to an electrical signal for processing by the HDTV 116 or the universal remote control device 120. More detailed explanation on the optical transceivers 112, 114 and the single optical fiber 150 is provided below with references to FIGS. 3A-3B and FIGS. 4A-4E.

In one embodiment, the universal remote control device 120 includes a speaker 122, telephone buttons 124, IR control buttons 126, other (non-IR) control buttons 128, a touchpad 130, and a microphone 132. The speaker 122 and the microphone 132 are included in the universal remote control device 120 so that it can be used as a telephone, i.e., to convert speech signals to electrical signals with the microphone 132 and convert electrical signals to audible sound using the speaker 122. The telephone buttons 124 are standard switches that serve as the keypad for dialing telephone numbers, as in conventional telephones. The IR control buttons 128 are standard switches that are used to generate IR control signals for controlling the consumer electronic devices such as the TV 116 or other remote electronic devices such as the DVD player 104, the set top box 106, or the video game console 108. Other control buttons 128 are included on the universal remote control device 120 to generate non-IR based remote control signals to control other electronic devices such as the personal computer 110 or software running on the computer 110.

Unlike conventional remote control devices, the universal remote control device 120 of the present invention has a wireless communication channel 136 in addition to the typical IR communication channel 138. The universal remote control device 120 sends IR remote control signals generated by the IR control buttons 126 to the television 116 via the IR communication channel 138. The IR remote control signals are received by the IR detector (IR RX) 117 on the TV 116, and decoded to control the operation of the TV 116. The IR remote control signals may also be intended to control other consumer electronic devices such as the DVD player 104, the set top box, and the video game console 108. In such case, the IR remote control signals are repeated and sent to the intended electronic devices via the IR backward channel of the single optical fiber 150. More detailed explanation regarding how the IR control signals are repeated and sent via the IR backward channel of the single optical fiber 150 can be found in U.S. patent application Ser. No. 11/423,381 entitled "Integrated Remote Control Signaling," filed on Jun. 9, 2006, which is incorporated by reference herein in its entirety.

In addition, other non-IR remote control signals generated by other control buttons 128 or the touch pad 130 or other non-IR data (e.g., electrical signals generated by the microphone 132) are communicated from the universal remote control device 120 to the sink (RX) optical transceiver 114 via the wireless communication channel 114. The wireless communication channel 136 may be any type of standard wireless communication channel using a wireless communication protocol, such as WiFi (IEEE 802.11), Bluetooth (IEEE 802.15.1), or other proprietary or non-proprietary RF (radio frequency) communication protocols.

In the example of FIG. 1, the non-IR remote control signals generated by other control buttons 128 or the touch pad 130 or other non-IR data (e.g., electrical signals generated by the microphone 132) are control signals or data intended for control of, or use by, the personal computer 110 or software running on the personal computer 110. The universal remote control device 120 first converts the other non-IR remote control signals or non-IR data signals to a data format compatible with a communication interface of the personal computer 110. For example, in one embodiment the non-IR remote control signals or non-IR data signals are converted by the universal remote control device 120 to a USB (Universal Serial Bus) format, and then sent to the Sink (RX) optical transceiver 114 via the wireless communication channel 136.

The Sink (RX) optical transceiver 114 converts the non-IR remote control signals or non-IR data signals to optical signals and sends them to the source (TX) optical transceiver 112 via the single optical fiber 150. The non-IR remote control signals or non-IR data signals 149 is then sent to the personal computer 110 as control signals or data for controlling the personal computer 110 or software running on the computer 110. In this manner, the universal remote control device 120 is capable of controlling the functionalities of the personal computer 110 that is located remotely from the remote control device 120. The universal remote control device 120 essentially functions as a remote, wireless device that combines the functions of a keyboard, touchpad (mouse), speaker, or microphone for use by the personal computer 110. Note that the non-IR control signals and non-IR data signals from the universal remote control signals 120 are transmitted in a wireless format initially via the wireless communication channel 136 and then in an optical signal format via the optical fiber 150.

The universal remote control device 120 enables the user to control the consumer electronic devices such as the HDTV 116 or DVD player 104, etc. as well as the personal computer 110, possibly placed at different remote locations, using the same remote control device 120. For example, a user may want to browse the Internet using the computer 110 while he is watching TV 116. In such case, the user may use the other control buttons 128 to launch an Internet browser application on the computer 110, while watching TV 116. Such browser command would be converted to a USB format by the remote control device 120, transmitted to the RX transceiver 114 via the wireless communication channel 136, sent to the TX transceiver 112 via the single optical fiber 150, and then sent to the computer 110 as a command to the computer 110. In response to the browser command, the computer 110 runs the browser application (not shown). Video and audio data from the browser application are sent as video/audio signals 144 to the TV 116 via the switching module 102, the TX transceiver 112, the optical fiber 150, and the RX transceiver 114. Thus, the TV 116 effectively operates as a video monitor (and a speaker) for the remotely located computer 110. The other control buttons 128 may include keyboard buttons and the touchpad 130 may be used as a mouse or similar input device, to enter various commands and data to the personal computer 110 remotely. Similarly, such commands or data from the control buttons 128 and the touchpad 130 are sent to the personal computer 110, via the RX optical transceiver 114, optical fiber 150, and the TX optical transceiver 112. Thus, the universal remote control device 120 effectively operates as a keyboard, mouse, or other input device for the computer 110, even though it is remotely located from the computer 110.

For another example, the universal remote control device 120 may be used as a telephone (e.g., a VoIP (Voice over IP) telephone) for use with VoIP telephone software 117 running on the personal computer 110. The VoIP phone software 117 is standard VoIP telephony software that emulates telephone functions on, for example, a TCP/IP connection on the Ethernet 140. The user may want to make a telephone call using the computer 110 while he is watching TV 116. In such case, just like accessing any other software on the computer 110 from the universal remote control device 120, the user may use the other control buttons 128 to launch the VoIP phone S/W 117 on the computer 110. Such application command would be converted to a USB format, transmitted to the RX transceiver 114 via the wireless communication channel 136, sent to the TX transceiver 112 via the single optical fiber 150, and then sent to the computer 110 as a command 149. In response, the computer 110 runs the VoIP phone S/W 117. Audio data 144 from the VoIP phone S/W 117 are sent to the universal remote control device 120 via the switching module 102, the TX transceiver 112, the optical fiber 150, the RX transceiver 114, and the wireless communication channel 136. From that point, the universal remote control device 120 effectively operates as a telephone. Voice data from the user is also input to the microphone 132 and sent to the VoIP software 117 on the computer 110 via the wireless communication channel 136, RX transceiver 114, the optical fiber 150, and the TX transceiver 112 for processing by the VoIP software 117. Voice data from the other user engaged in the telephone call is received by the VoIP phone S/W from the Ethernet connection 140 or the PSTN 142 and sent to the speaker 122 of the universal remote control device 120 via the switching module 102, the TX transceiver 112, the optical fiber 150, the RX transceiver 114, and the wireless communication channel 136. Although in the example shown in FIG. 1 the VoIP phone S/W 117 is shown as running on the personal computer 110, in other embodiments the VoIP phone S/W may run on a micro-controller of the universal remote control device 120 itself and simply utilize the Ethernet 140 or PSTN connection of the remotely located computer 110. An example of the VoIP phone S/W running on the universal remote control device 120 itself is illustrated in the example of FIG. 2.

Note that the use of the optical fiber 150 provides the ability to transmit uncompressed data, which is beneficial because compression typically results in resolution loss and potential video discontinuity. Thus, there are advantages in using uncompressed data transmission. With optical fiber, both compressed and uncompressed data transmission are supported. Thus, the optical fiber 150 allows for compressed or uncompressed data transmission, simultaneous video, audio, and control signal transmission, and/or high bandwidth transmission. The optical fiber 150 is substantially transparent and may be fairly thin (e.g., 0.5 mm) and considerably thinner than conventional cabling. Moreover, the cost of the optical fiber 150 may be lower than that of conventional prior art multi-pin copper or gold cabling.

Figure 2:
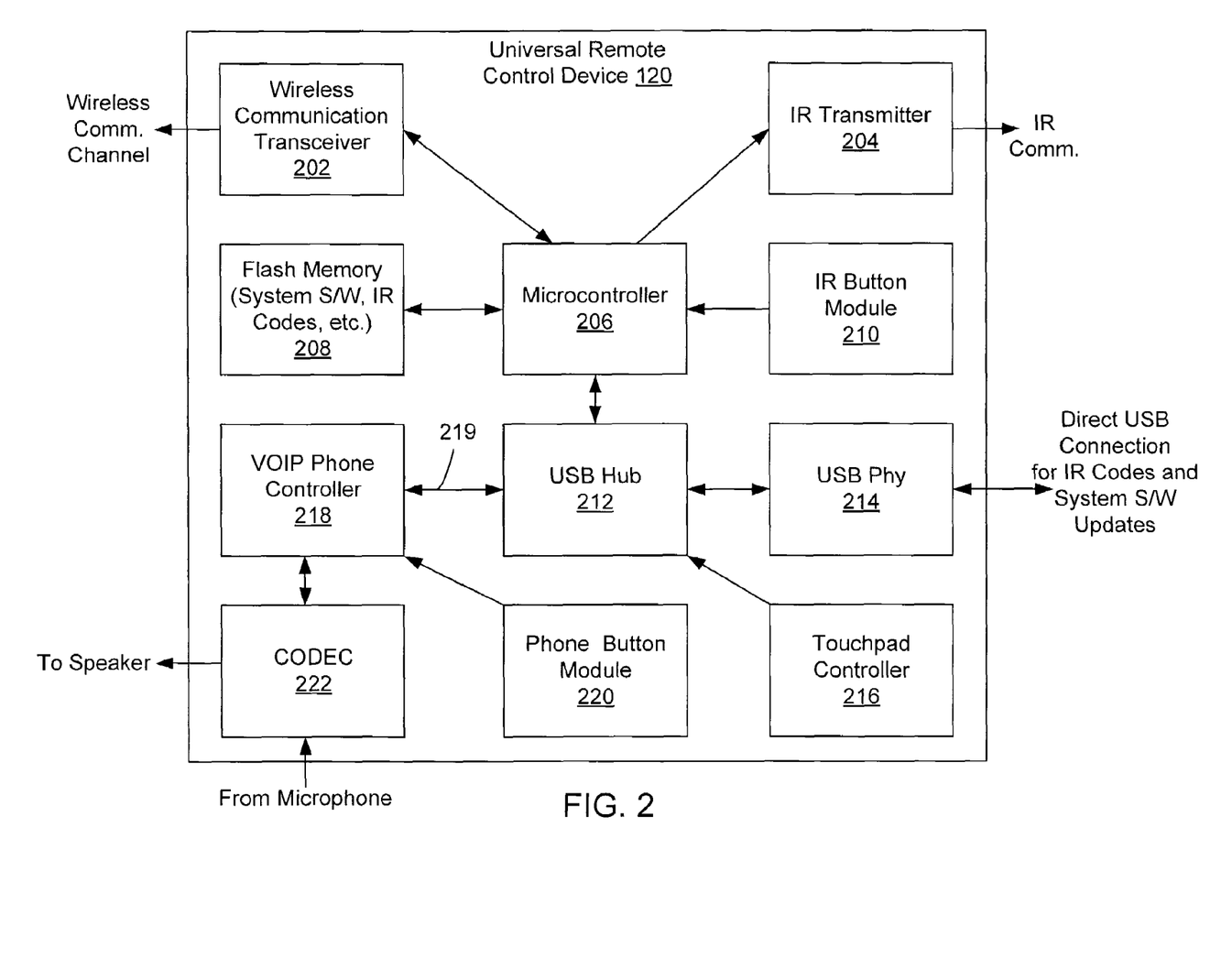
FIG. 2 is a block diagram illustrating the internal components of the universal remote control device, according to one embodiment of the present invention.

FIG. 2 is a block diagram illustrating the internal components of the universal remote control device, according to one embodiment of the present invention. The universal remote control device 120 includes, in addition to other conventional components that may not have been illustrated in FIG. 2, a microcontroller 206, an IR transmitter 204, a wireless communication transceiver 202, a memory device 208 (such as a flash memory device), an IR button module 210, a VoIP phone controller 218, a CODEC (Coder/Decoder) 222, a phone button module 220, a touchpad controller 216, a USB hub 212, and USB Phy 214.

The microcontroller 206 can be any type of microprocessor or similar component, and controls the operations of the wireless communication transceiver 202, the flash memory 208, the IR transmitter 204, the IR button module 210, and the USB hub 212. The wireless communication transceiver 202 manages the wireless transmission of data between the universal remote control device 120 and the RX optical transceiver 114 over the wireless communication channel 136. In one embodiment, the wireless communication transceiver 202 is a WiFi transceiver, although other types of wireless communication protocols (e.g. Bluetooth) may be used. The memory device 208 stores operating system software as well as IR remote control codes for the universal remote control device 120. The IR button module 210 generates electrical signals corresponding to the activated IR control buttons 126 by the user. In response, the IR transmitter 204 generates IR control signals corresponding to the activated IR control buttons 126 based on the IR remote control codes stored in the memory 208, under control of the microcontroller 206.

The VoIP phone controller 218 may be a VoIP software module or a hardware-based microcontroller with the VoIP software hardcoded onto it. In the example of FIG. 2, the VoIP phone controller 218 is included in the universal remote control device 120 itself, although in other embodiments it can be omitted from the universal remote control device 120 and rather included as software on the computer 110. The VoIP phone controller 218 performs the functionalities of a VoIP phone. More specifically, the VoIP phone controller 218 generates data signals 219 under the employed VoIP protocol based on the control signals generated by the phone button module 220 in response to a user's selection of a specific phone button 124 or based on the audio signals picked up from the microphone 132 and converted to compressed digital signals by the CODEC 222. The VoIP phone controller 218 also outputs compressed digital audio signals that the universal remote control device 120 received over the wireless communication channel 120 via the wireless communication transceiver 202, the microcontroller 206, and the USB hub 212 to the CODEC 222 for output to the speaker 122 as an audible signal. The phone button module 220 generates electrical phone control signals for controlling the functionalities of the VoIP phone operations and provides them to the VoIP phone controller 218, in response to a user's selection of telephone buttons 124. The touchpad controller 216 generates electrical control signals corresponding to tactile inputs to the touchpad 130 and provides them to the USB hub 212.

The CODEC 222 is a standard audio CODEC (coder-decoder), and converts an audio signal received by the microphone 132 into compressed digital form for transmission and a compressed digital signal back into an uncompressed audio signal for replay by the speaker 122. The CODEC 222 accomplishes the audio signal to digital signal conversion by sampling the audio signal several thousand times per second, converting each sample into digitized data and compressing. In one embodiment, the CODEC 222 is a G.729A codec that has a sampling rate of 8,000 times per second.

The USB hub 212 is converts input data into USB format and also switches the USB data input from one of the multiple components connected to the USB hub 212, so that the USB data can be transmitted over the wireless communication channel 136. In the example of FIG. 2, the USB hub 212 is coupled to receive either the compressed audio data or other VoIP control data from the VoIP phone controller 218 or the control signals for controlling the computer 110 from the touchpad controller 216. The USB hub 212 converts the received signals into USB format and provides the converted USB data to the wireless communication transceiver 202 under control of the microcontroller 206. The wireless communication transceiver 202 then sends the USB data over the wireless communication channel 136 to the RX optical transceiver 114, which is then communicated to the computer 110 via the optical fiber 150 and the TX transceiver 112. Note also that the universal remote control device 120 also includes a USB phy 214 so that the universal remote control device 120 can communicate with external devices directly via a USB interface to update software or IR codes, and the like, stored in the universal remote control device 120.

Figure 3A:
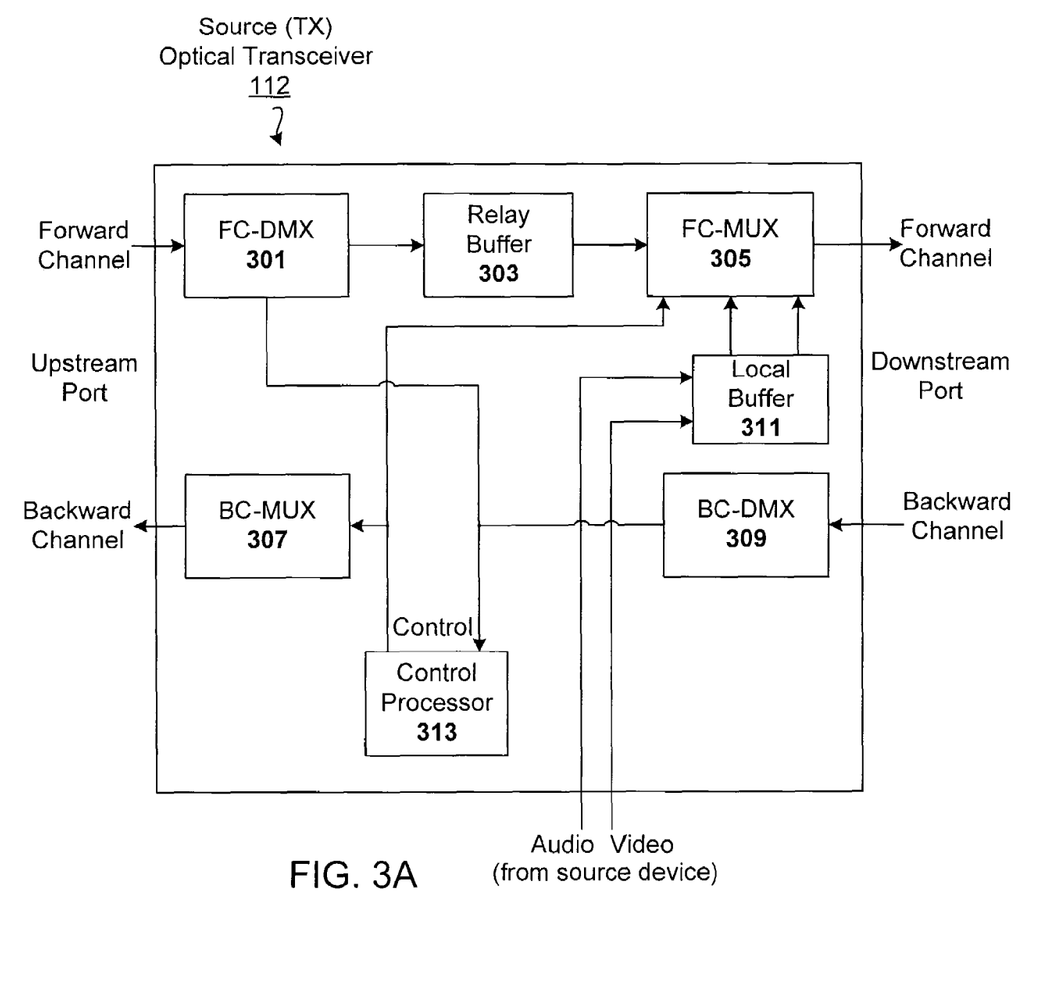
FIG. 3A is a block diagram illustrating the source (TX) optical transceiver, according to one embodiment of the present invention.
Figure 3B:
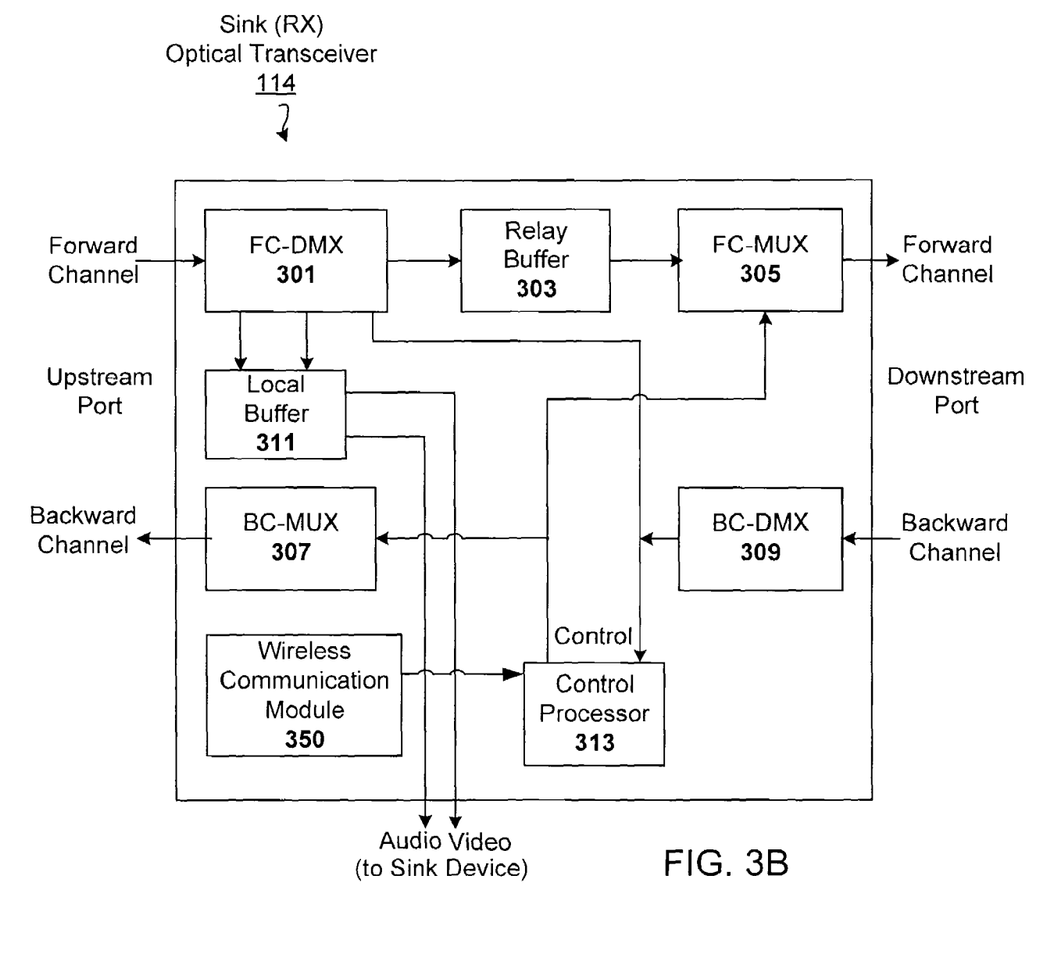
FIG. 3B is a block diagram illustrating the sink (RX) optical transceiver, according to one embodiment of the present invention.

FIG. 3A is a block diagram illustrating the source (TX) optical transceiver, according to one embodiment of the present invention. This example transceiver 112 has a downstream port and an optional upstream port. The downstream port includes a high speed forward channel transmission port and a low speed backward channel receiving port. The optional upstream port, which includes a low speed backward channel transmission port and a high speed forward channel receiving port, can receive video/audio signals from an upstream source device in a daisy-chain configuration, if needed. Note that forward channel in FIGS. 1, 3A, and 3B herein is in the direction from the source (TX) optical transceiver 112 to the sink (RX) optical transceiver 114, and that the backward channel in FIGS. 1, 3A, and 3B is in the direction from the sink (RX) optical transceiver 114 to the source (TX) optical transceiver 112. In operation, the TX optical transceiver 112 receives video and audio data 146 from a local video/audio source (e.g., DVD player 104, step top box 106, video game console 108, personal computer 110) through the switching module 102. The video and audio data 146 is saved into an elastic buffer called local buffer 311. The transceiver 112 has a forward channel multiplexer (FC-MUX) 305 that multiplexes the buffered video/audio data for transmission via the downstream high speed forward channel. If there is an upstream port, the forward channel demultiplexer (FC-DMX) 301 sends received control data to a local control processor 313. The FC-DMX 301 also temporarily buffers received control data in an elastic buffer called relay buffer 303. The FC-MUX 305 also multiplexes the control data from that relay buffer 303 for transmission via the downstream high speed forward channel. The two elastic buffers 303 and 311 (e.g., FIFO buffers) are used to buffer respective stream data while the other stream is being transmitted. The TX transceiver 112 also has a backward channel demultiplexer (BC-DMX) 309 that demultiplexes control data received via the downstream backward channel, so that data can then be provided to the local control processor 313. The control data from the upstream high speed forward channel (extracted by the FC-DMX 301) and from the downstream low speed backward channel (extracted by the BC_DMX 309) are sent to the local control processor 313 for processing. The control processor 313 also transmits the control data to the downstream device via the FC_MUX 305, and to the upstream device (if there is one) via a backward channel multiplexer (BC-MUX) 307, which multiplexes the control data for transmission via the upstream backward channel. Multiplexing in the backward channel is used to selectively transmit control signals for multiple electronic devices (e.g., the DVD player 104, set top box 106, etc.) via the single optical fiber 150.

FIG. 3B is a block diagram illustrating the sink (RX) optical transceiver, according to one embodiment of the present invention. This example optical transceiver 114 has an upstream port and an optional downstream port. The upstream port includes a high speed forward channel receiving port and a low speed backward channel transmission port. The optional downstream port, which includes a low speed backward channel receiving port and a high speed forward channel transmission port, can provide video/audio signals to a downstream sink device in a daisy-chain configuration, if necessary, although they would not be needed in the embodiment of FIG. 1.

In operation, the optical transceiver 114 receives video, audio, and control data from the high speed forward channel receiving port. The FC-DMX 301 sends received control data to a local control processor 313. The video and audio data are saved into the local buffer 311, in preparation for display (e.g., by operation of video/audio processing section 313) in the digital TV 116 or other such sink device. If the received video and audio data is not destined for the local display device, the FC-DMX 301 writes that data into the relay buffer 303. The FC-MUX 305 multiplexes the video/audio data from that relay buffer 303 for transmission via the downstream high speed forward channel, if a downstream port exists. The two elastic buffers 303 and 311 (e.g., FIFO buffers) are used to buffer respective stream data while the other stream is being transmitted.

The control data from the upstream high speed forward channel (extracted by the FC-DMX 301) and from the downstream low speed backward channel (extracted by the BC-DMX 309) are sent to the local control processor 313 for processing. The control processor 313 also transmits the control data to the downstream device (if there is one) via the FC-MUX 305, and to the upstream device via a BC-MUX 307, which multiplexes the control data for transmission via the upstream backward channel. Note that the processing of control information can be implemented the same way as that of the source device.

Each of FC-MUX 305 and BC-MUX 307 can be programmed or otherwise configured to provide simple multiplexing. Likewise, each of FC-DMX 301 and BC-DMX 309 can be programmed or otherwise configured to provide complementary demultiplexing. Such multiplexing and demultiplexing enable the sending of control data intended for multiple electronic devices using a single optical fiber 150. In one particular embodiment, each the multiplexers is implemented as a multiplex state machine, and the demultiplexers are implemented as a demultiplex state machine. Other techniques for serializing data for transmission, and then deserializing that data for receiver processing can be used here, as will be apparent in light of this disclosure. Note that additional details on the structure and functionalities of the transceivers 112, 114 of FIGS. 3A and 3B can be found in U.S. patent application Ser. No. 11/406,558, entitled "Protocol for Uncompressed Multimedia Data Transmission," filed on Apr. 18, 2006, which is incorporated by reference herein in its entirety.

Note that the sink (RX) optical transceiver also includes a wireless communication transceiver 350, which is the counterpart to the wireless communication transceiver 202 in the universal remote control device 120. The wireless communication transceivers 350 and 202 operate in conjunction with each other to transmit and receive data over the wireless communication channel 136. Data received by the wireless communication transceiver 350 is sent to the backward channel of the upstream port of the sink (RX) optical transceiver 114 under control of the control processor 313 and the BC-MUX 307, for transmission to the computer 110 over the optical fiber 150.

Figure 4A:
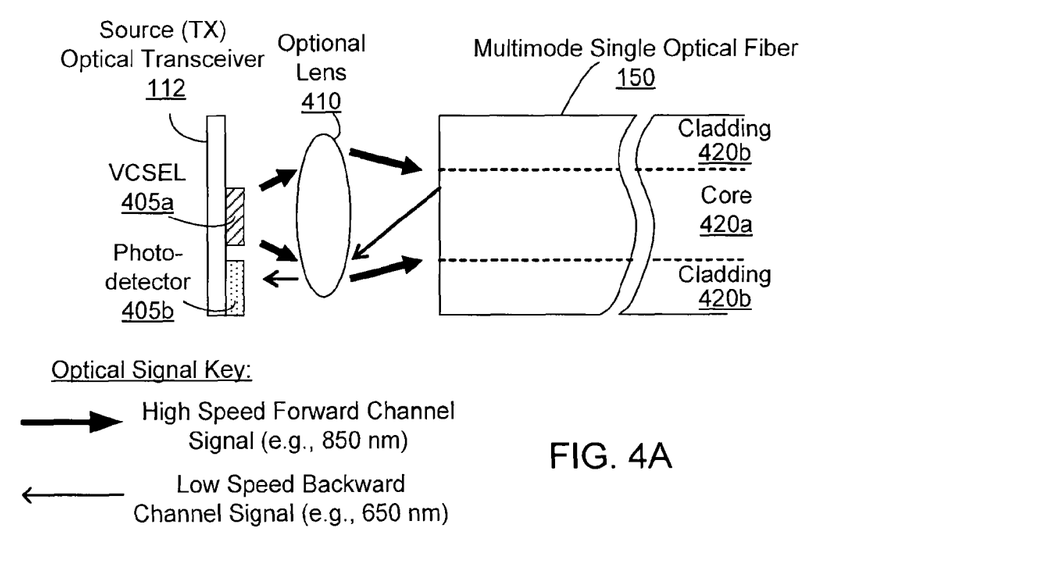
FIG. 4A illustrates the source (TX) optical transceiver configured as the forward channel signal transmitter and backward channel signal receiver for use with the multimode signal optical fiber, according to one embodiment of the present invention.

FIG. 4A illustrates the source (TX) optical transceiver configured as the forward channel signal transmitter and backward channel signal receiver for use with the multimode signal optical fiber, according to one embodiment of the present invention. As can be seen, this embodiment includes a transceiver module 112 that is operatively coupled to a multimode optical fiber 150 via an optional lens 410. In other embodiments, the transceiver module 112 is directly coupled to the multimode optical fiber 150 (i.e., no lens). In this example configuration, the transceiver module 112 is also coupled to a light source such as a VSCEL (Vertical-Cavity Surface-Emitting Laser) 405a for the forward channel transmitter and a photodetector 405b for the backward channel receiver, although in other embodiments the transceiver module 112 can be viewed as including these components. In one particular embodiment, the VSCEL 205a and photodetector 205b are packaged into a single can or other suitable package. In the embodiment of FIG. 4A, the forward channel is high speed, and uses a light source (e.g., VCSEL) 405a at about 850 nm in the GHz modulation level (e.g., 1 GHz or higher), although other wavelengths such as 1310 nm or 1550 nm may be used for the light source. Also in the embodiment of FIG. 4A, the backward channel is low speed and has a light source (e.g., LED) at, for example, 650 nm in the MHz modulation level (e.g., 10 MHz or less), and the photodetector 405b is suitable for detecting optical signals in that wavelength.

Figure 4B:
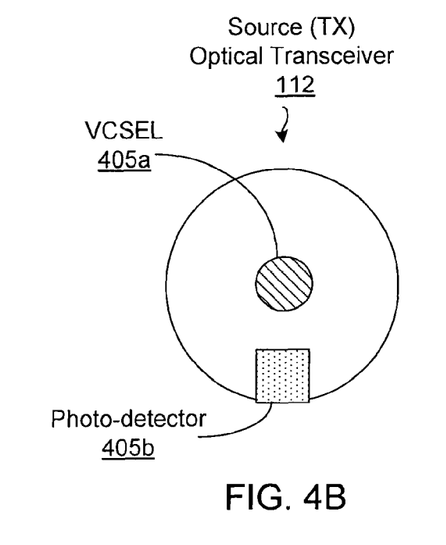
FIG. 4B illustrates a cross-sectional view of the source (TX) optical transceiver of FIG. 4A, according to one embodiment of the present invention.
Figure 4C:
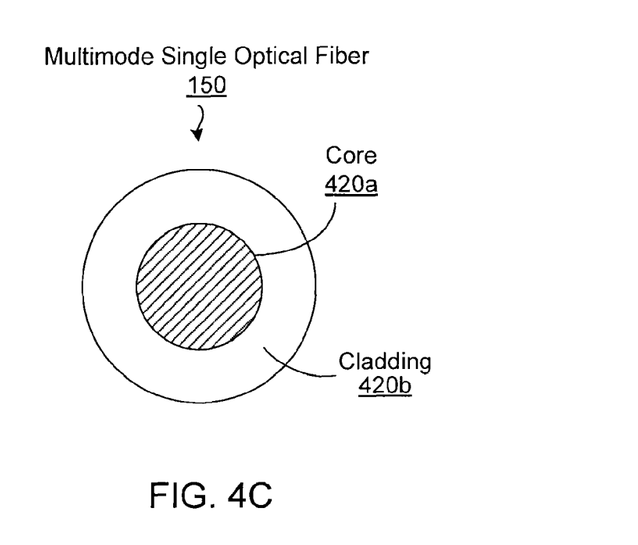
FIG. 4C illustrates a cross-sectional view of the single optical fiber of FIG. 4A, according to one embodiment of the present invention.

FIG. 4B illustrates a cross-sectional view of the transceiver module coupled to the VCSEL and photodetector, according to one embodiment of the present invention. In one embodiment, the VCSEL 405a and the photodetector 405b are packaged about 20 to 80 μm apart in the same can. FIG. 4C illustrates a cross-sectional view of the single optical fiber 159 of FIG. 4A, according to one embodiment of the present invention. The multimode single optical fiber 150 includes a core 420a and a cladding 420b. In one embodiment, the optical fiber 150 has a 0.062 mm (diameter) core and 0.125 mm (diameter) cladding, although there are numerous fiber dimensions that could be used. The optical power of the forward channel stays mainly within the core 420a and the optical power of the backward channel stays mainly in the cladding 420b. There are overlaps in optical distributions, which do not impact communications of the channels.

The VCSEL 405a (or other suitable light source) of the forward channel is aligned at the core 420a of the optical fiber 150. The optional lens 410 can be used to focus the light emitted from the VCSEL 405a to the core 420a of the optical fiber 150. Alternatively, the light emitted from the VCSEL 405a can be coupled directly to the core 420a of the fiber 150. The photodetector 405b of the backward channel is aligned with the cladding 420b of the optical fiber 420. The optional lens 410 can be used to focus the light received from the cladding 420b to the photodetector 405b of the transceiver module 112. Alternatively, the light received from the cladding 420b can be coupled directly to the photodetector 405b.

Figure 4D:
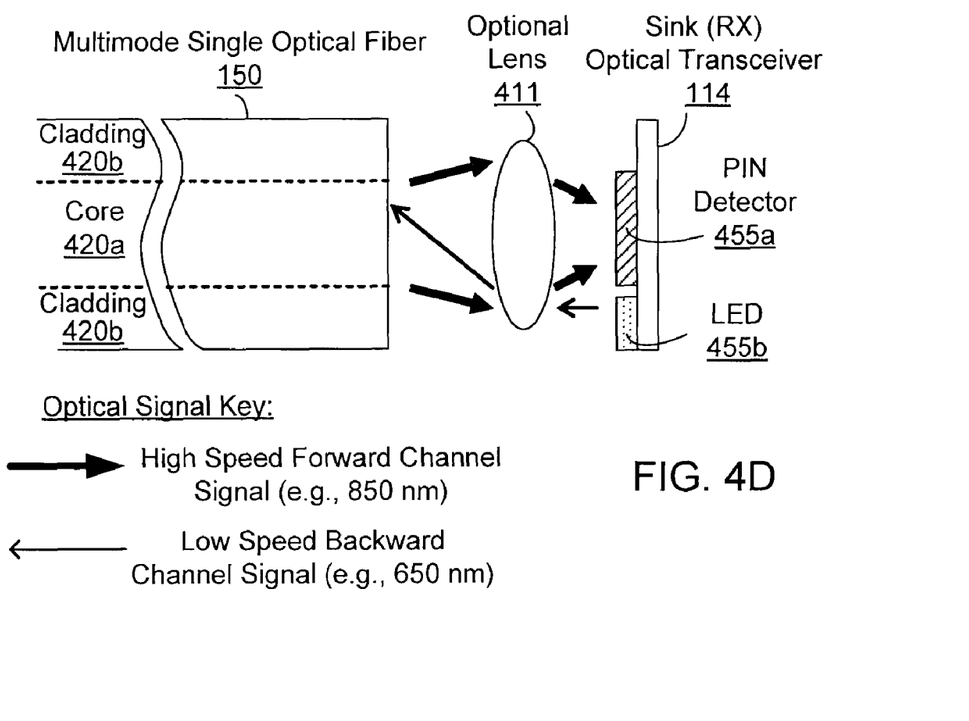
FIG. 4D illustrates the sink (RX) optical transceiver configured as the backward channel signal transmitter and forward channel signal receiver for use with the multimode signal optical fiber, according to one embodiment of the present invention.

FIG. 4D illustrates the sink (RX) optical transceiver configured as the backward channel signal transmitter and forward channel signal receiver for use with the multimode signal optical fiber, according to one embodiment of the present invention. As can be seen, this embodiment includes a transceiver module 114 that is operatively coupled to the optical fiber 150 via an optional lens 411. In other embodiments, the transceiver module 114 is directly coupled to the multimode fiber 150 (i.e., no lens). In this example configuration, the transceiver module 114 is coupled to a PIN (p-type, intrinsic, n-type) diode detector 455a used for the forward channel receiver and an LED (light emitting diode) 455b used for the backward channel transmitter. In one particular embodiment, the PIN detector 455a and LED 455b are packaged into a single can or other suitable package.

Figure 4E:
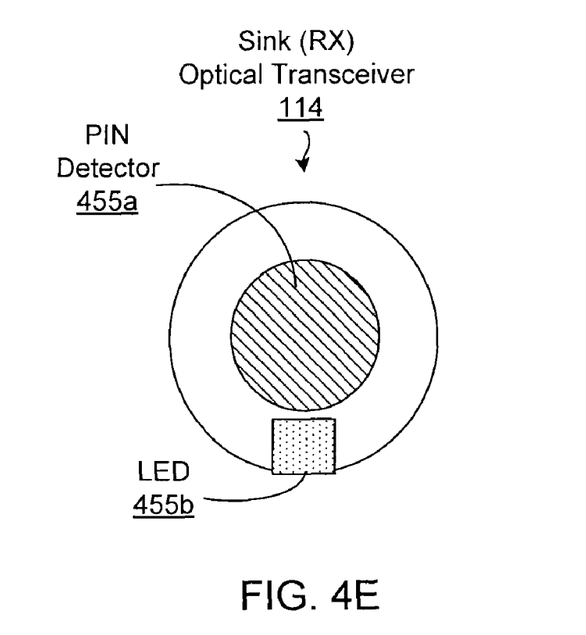
FIG. 4E illustrates a cross-sectional view of the sink (RX) optical transceiver of FIG. 4D, according to one embodiment of the present invention.

FIG. 4E illustrates a cross-sectional view of the sink (RX) optical transceiver of FIG. 4D, according to one embodiment of the present invention. In one embodiment, the PIN detector 455a and the light source 455b are packaged about 20 to 80 μm apart in the same can. The LED 455b (or other suitable light source) of the backward channel is aligned with the cladding 420b of the optical fiber. The optional lens 411 can be used to focus the light emitted from the LED 455b to the cladding 420b of the optical fiber 150. Alternatively, the light emitted from the LED 455b can be coupled directly to the cladding 420b of the optical fiber 150. The PIN detector 455a of the forward channel is aligned at the core 420a of the optical fiber 150. The optional lens 411 can be used to focus the light received from the core 420a of the optical fiber 150 to the PIN detector 405a. Alternatively, the light received from the core 420a of the optical fiber 150 can be coupled directly to the PIN detector 455a. Additional detailed explanation regarding the optical fiber 150 and its couplings with the transceivers 112, 114 can be found in U.S. patent application Ser. No. 11/173,409, entitled "Bidirectional HDCP Transmission Module Using Single Optical Fiber," filed on Jun. 30, 2005, which is incorporated by reference herein in its entirety.

Figure 5:
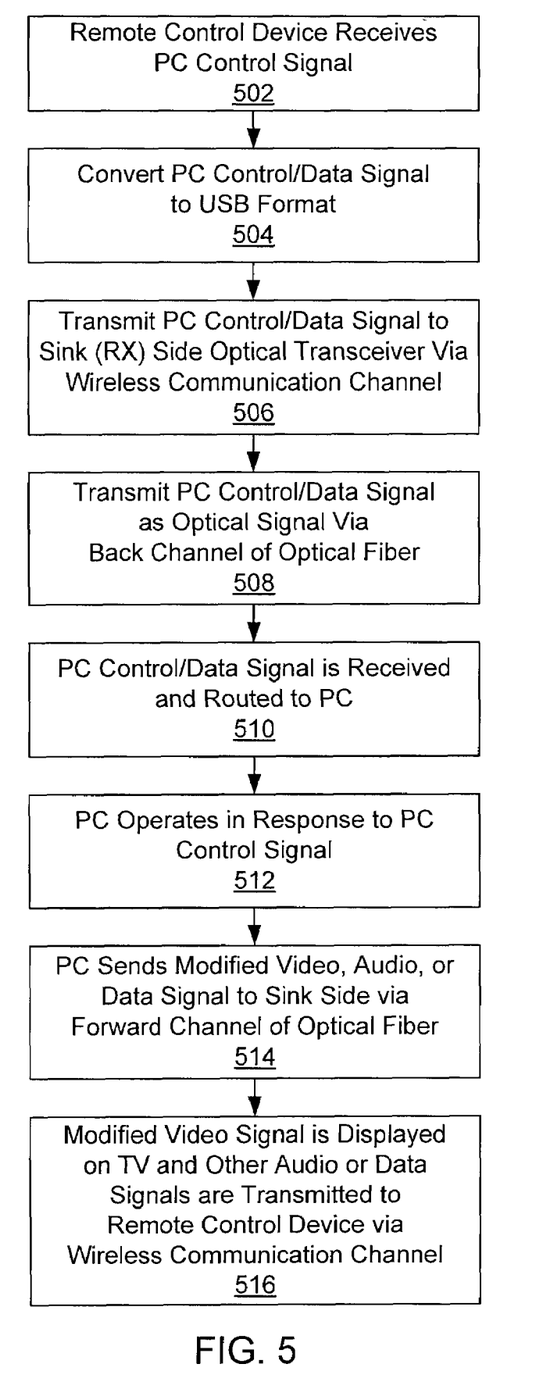
FIG. 5 illustrates a method of controlling a personal computer using the universal remote control device and the single optical fiber, according to one embodiment of the present invention.

FIG. 5 illustrates a method of controlling a personal computer using the universal remote control device and the single optical fiber, according to one embodiment of the present invention. The method of FIG. 5 is explained herein with a focus toward how the universal remote control device 120 is used to control the personal computer 110 via the optical fiber 150. The manner in which the universal remote control device 120 controls the TV 116 or other consumer electronic devices via IR communication 138 is conventional and thus need not be explained herein.

First, in step 502 the remote control device 120 receives PC control or data signals from the other control buttons 128, touch pad 130, the telephone button 124, or the microphone 132. The control/data signals are then converted 504 to USB format by the USB hub 212 and transmitted 506 to the sink (RX) side optical transceiver 114 via the wireless communication transceiver 202 and the wireless communication channel 136. Then, the control/data signals in USB format are converted by the sink (RX) side optical transceiver 114 to optical signals and sent 508 to the source (TX) side optical transceiver 112 via the backward channel of the optical fiber 150. The source (TX) optical transceiver 114 receives 510 the optical signals and recovers the control/data signals in USB format, which is then routed 510 to the computer 110. In response to the control/data signals, the computer 110 sends 514 modified video, audio, or data signals to the sink (RX) side optical transceiver 114 via the source (TX) optical transceiver 112 and the optical fiber 150, as an optical signal. The RX optical transceiver 114 provides 516 the received video, audio, or data signals to the intended device, i.e., to the TV 116 or to the universal remote control device 120 via the wireless communication channel 136.

The remote control device according to the present invention has the advantage that it can be used to control a plurality of electronic devices that may be remotely located from each other, by utilizing the optical fiber network connecting these electronic devices. The IR communication channel of the remote control device may be used to transmit IR control signals to control, for example, a consumer electronic device such as a TV that is located close to the remote control device within the IR communication range. The wireless communication channel may be used to transmit control signals for controlling other electronic devices such as a computer that is located remotely from the remote control device, because such control signals may be transmitted remotely to those other electronic devices via the optical fiber. By including VoIP functionalities and input means (e.g. touchpad) in the remote control device, the remote control device becomes a "universal" remote control device that combines the functionalities of an IR remote control device, a computer input device such as a mouse or a keyboard, and a telephone, all in one device. As a result, a user may perform most control operations of multiple electronic devices using the single remote control device of the present invention.

Upon reading this disclosure, those of ordinary skill in the art will appreciate still additional alternative structural and functional designs for a universal remote control device and its applications through the disclosed principles of the present invention. Thus, while particular embodiments and applications of the present invention have been illustrated and described, it is to be understood that the invention is not limited to the precise construction and components disclosed herein. Various modifications, changes and variations which will be apparent to those skilled in the arrangement, operation and details of the method and apparatus of the present invention disclosed herein without departing from the spirit and scope of the invention as defined in the appended claims.

What is claimed is:

1. A remote control device for controlling a first electronic device and a second electronic device, the remote control device comprising:

an infrared (IR) transmitter for transmitting a first control signal for controlling the first electronic device via an IR communication channel; and a wireless communication interface for transmitting a second control signal for controlling the second electronic device, the second control signal being transmitted from the remote control device to a first optical transceiver via a wireless communication channel, wherein the first control signal and the second control signal are further transmitted from the first optical transceiver to a second optical transceiver via an optical fiber, the first control signal further provided by the second optical transceiver to the first electronic device to control the first electronic device, and the second control signal further provided by the second optical transceiver to the second electronic device to control the second electronic device.

2. The remote control device of claim 1, wherein the first control signal and the second control signal are transmitted via a backward channel of the optical fiber.

3. The remote control device of claim 1, wherein the second electronic device is a computer, and the second control signal includes a command or data input to the computer.

4. The remote control device of claim 1, further comprising:
    a USB (universal serial bus) interface converting the second control signal to a USB format second control signal for transmission to the optical transceiver via the wireless communication channel.

5. The remote control device of claim 4, wherein the USB interface is coupled to receive the second control signal from one of a plurality of components connected to the USB interface.

6. The remote control device of claim 1, further comprising a VoIP (Voice Over IP) telephone controller for operating the remote control device as a VoIP telephone.

7. The remote control device of claim 6, further comprising:
    a microphone for converting a first acoustic signal to a first electrical signal;
    a speaker for converting a second electrical signal to a second acoustic signal;
    a CODEC (a coder/decoder) coupled to the microphone, the speaker, and the VoIP telephone controller, the CODEC coding the first electrical signal to a first, compressed electrical signal for processing by the VoIP telephone controller, and the CODEC decoding a second, compressed electrical signal to the second electrical signal.

8. The remote control device of claim 1, further comprising:
    a touchpad for receiving a tactile input from a user; and
    a touchpad controller for generating the second control signal based on the tactile input from the user.

9. A remote control system comprising:
    a first electronic device;
    a second electronic device;
    an optical fiber coupled between a first optical transceiver and a second optical transceiver;
    a remote control device for controlling the first electronic device and the second electronic device, the remote control device comprising:
        an infrared (IR) transmitter for transmitting a first control signal for controlling the first electronic device via an IR communication channel; and
        a wireless communication interface for transmitting a second control signal for controlling the second electronic device to the first optical transceiver via a wireless communication channel, wherein the first control signal and the second control signal are further transmitted from the first optical transceiver to the second optical transceiver via the optical fiber and, the first control signal further provided by the second optical transceiver to the first electronic device to control the first electronic device, and the second control signal further provided by the second optical transceiver to the second electronic device to control the second electronic device.

10. The remote control system of claim 9, wherein the first control signal and the second control signal are transmitted via a backward channel of the optical fiber.

11. The remote control system of claim 9, wherein the second electronic device is a computer, and the second control signal includes a command or data input to the computer.

12. The remote control system of claim 9, wherein the remote control device further comprises:
    a USB (universal serial bus) interface converting the second control signal to a USB format second control signal for transmission to the first optical transceiver via the wireless communication channel.

13. The remote control system of claim 12, wherein the USB interface of the remote control device is coupled to receive the second control signal from one of a plurality of components connected to the USB interface.

14. The remote control system of claim 9, wherein the remote control device further comprises a VoIP (Voice Over IP) telephone controller for operating the remote control device as a VoIP telephone.

15. The remote control system of claim 14, wherein the remote control device further comprises:
    a microphone for converting a first acoustic signal to a first electrical signal;
    a speaker for converting a second electrical signal to a second acoustic signal;
    a CODEC (a coder/decoder) coupled to the microphone, the speaker, and the VoIP telephone controller, the CODEC coding the first electrical signal to a first, compressed electrical signal for processing by the VoIP telephone controller, and the CODEC decoding a second, compressed electrical signal to the second electrical signal.

16. The remote control system of claim 9, wherein the remote control device further comprises:
    a touchpad for receiving a tactile input from a user; and
    a touchpad controller for generating the second control signal based on the tactile input from the user.

17. A method for controlling a first electronic device and a second electronic device using a remote control device, the method comprising:
    receiving a first control signal for controlling the first electronic device;
    transmitting the first control signal from the remote control device via an infrared (IR) communication channel;
    receiving a second control signal for controlling the second electronic device;
    transmitting the second control signal from the remote control device to a first optical transceiver via a wireless communication channel;
    transmitting the first control signal and the second control signal from the first optical transceiver to a second optical transceiver via an optical fiber, the first control signal further provided by the second optical transceiver to the first electronic device to control the first electronic device, and the second control signal further provided by the second optical transceiver to the second electronic device to control the second electronic device.

18. The method of claim 17, wherein the second electronic device is a computer, and the second control signal includes a command or data input to the computer.

19. The method of claim 17, further comprising converting the second control signal to a USB (universal serial bus) format second control signal for transmission to the optical transceiver via the wireless communication channel.

* * * * *